INVENTORS
Robert M. Krithers.
George E. Lemieux.
Howard L. Croswhite

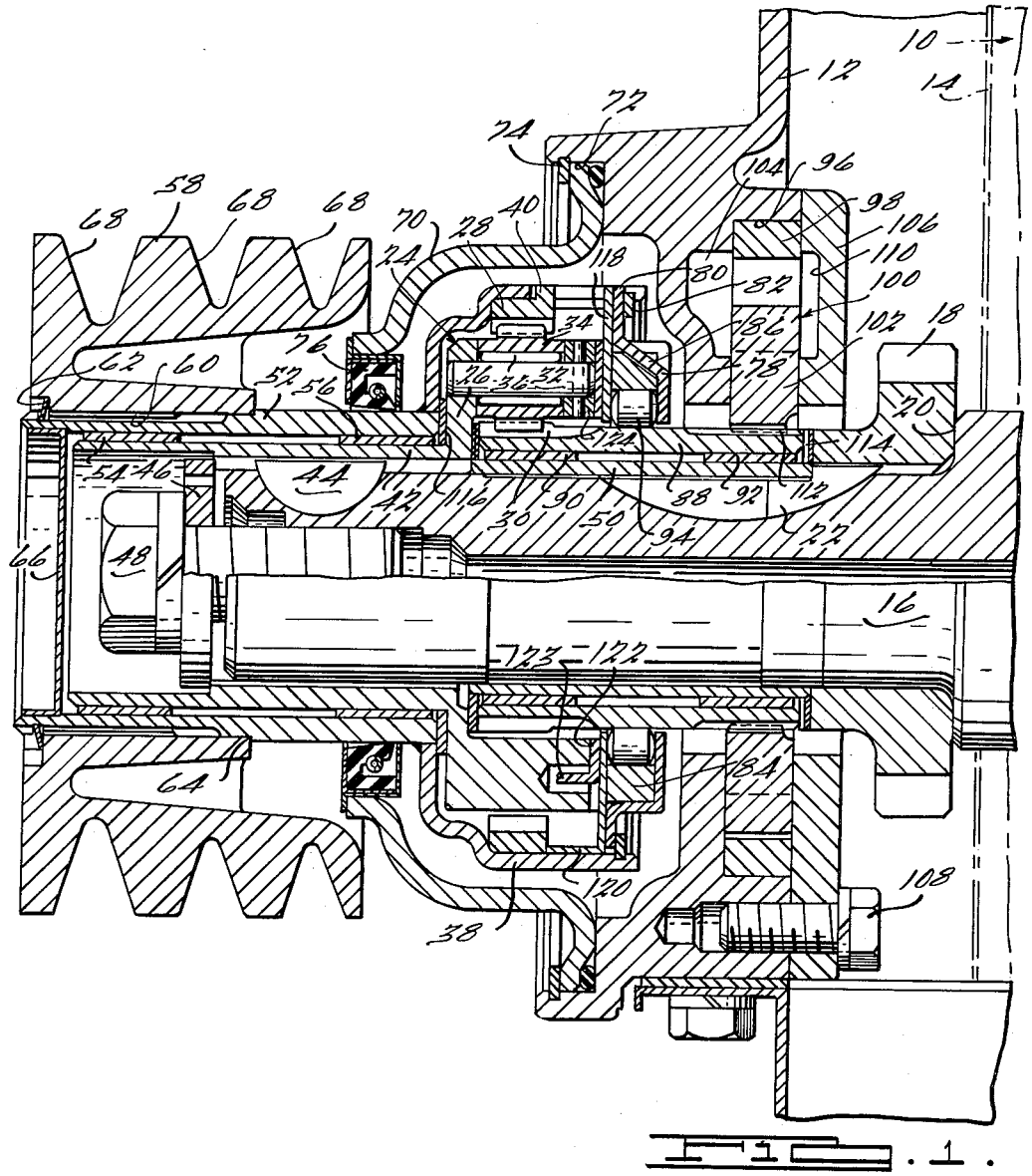

BY Edwin C. McRae
John R. Faulkner,
and Donald J. Harrington
ATTORNEYS

United States Patent Office 2,987,943
Patented June 13, 1961

2,987,943
TWO-SPEED DRIVE
George E. Lemieux, Dearborn, Robert M. Krithers, Clarkston, and Howard L. Croswhite, Livonia, Mich., assignors to Ford Motor Company, Dearborn, Mich., a corporation of Delaware
Filed Oct. 30, 1958, Ser. No. 770,826
16 Claims. (Cl. 74—782)

Our invention relates generally to an improvement in power transmitting drives and more particularly to a two-speed drive capable of being used with an engine powered vehicle for driving the engine accessories and other vehicle accessories.

We contemplate that our improved drive may be used in conventional automotive vehicles and it is capable of delivering power from the vehicle engine crankshaft to the engine air cooling fan, the engine coolant pump, the engine ignition voltage generator, pumps for power steering and air conditioning systems and other engine driven accessories.

It is conventional automotive practice to power such accessories by means of a belt and pulley drive mechanism in which an engine crankshaft mounted pulley serves as the driving member. The accessories are driven in such a conventional arrangement at a fixed driving speed ratio throughout the entire engine speed range. The vehicle engine speed usually varies in magnitude from a few hundred r.p.m. to about 4500 r.p.m. or more and the accessories are therefore required to function throughout a relatively wide speed range. It is necessary in conventional arrangements to choose a pulley ratio for the accessories which will permit the accessories to function properly at the lower portion of the speed range. However, this necessarily results in an excessive accessory speed when the engine operates at higher speeds and this in turn results in an undesirable loss of horsepower and reduces the over-all effectiveness of the vehicle power train during operation at higher speeds.

The improvement of our instant invention is designed to overcome these problems by providing an accessory drive with two speed ratios whereby the ratio of accessory speed to engine speed is greater during operation of the engine at reduced speeds than during operation of the engine at higher speeds. In the preferred embodiment of our invention this speed variation is accomplished by overdriving the engine crankshaft mounted pulley during operation of the engine at relatively low speeds and by driving the same with a direct driving ratio during operation of the engine at a relatively high speed.

We contemplate that the mechanism will automatically shift from the overdriving ratio to the direct driving ratio at an engine speed of approximately 1500 r.p.m., and during subsequent operation of the engine at speeds above 1500 r.p.m., the mechanism will operate with a direct driving relationship between the engine crankshaft and the associated pulley. In a typical automotive application the horsepower requirements for the accessories varies from zero at stall to about 20 horsepower at 1500 r.p.m. After the shift into the direct driving ratio occurs, the horsepower requirements will vary from about 10 horsepower at 1500 r.p.m. to about 40 horsepower at 4500 r.p.m.

The net horsepower required to drive the accessories is generally proportional to the square of the speed, and for this reason the reduced speed ratio at which the accessories are driven in the higher speed range results in a considerable horsepower saving when compared to conventional drives.

The provision of an improved drive mechanism of the type above mentioned being a principal object of our invention, it is a further object of our invention to provide an improved control system for automatically initiating a shift from one speed ratio to another so that the transition from one speed ratio to another occurs with a high degree of smoothness.

It is a further object of our invention to provide a simple planetary gear transmission capable of being used to drive vehicle engine accessories and wherein the reaction gear member of the transmission is adapted to be selectively held or released by means of a positive displacement fluid pump, one element of the pump being mechanically connected to the reaction gear member.

It is a further object of our invention to provide an improved accessory drive of the type above set forth wherein the means for initiating a speed ratio shift utilizes engine oil pump pressure as an engine speed signal.

It is a further object of our invention to provide an accessory drive of the type above set forth wherein the control system is capable of producing a hysteresis effect whereby a shift from a lower speed ratio to a higher speed ratio takes place at an engine speed which is greater than the speed at which a shift from the higher speed ratio to a lower speed ratio occurs.

It is a further object of our invention to provide a two-speed vehicle engine accessory drive of simplified construction which requires a minimum of space.

It is a further object of our invention to provide a two-speed engine accessory drive with planetary gear members wherein a positive displacement fluid pump is used to selectively anchor the reaction gear member and wherein automatically operated control valve means are provided for alternately blocking the high pressure discharge side of the pump and for opening the same to exhaust.

It is a further object of our invention to provide an automatically operated two-speed drive of the type set forth in the preceding paragraph wherein the valve means functions to simultaneously open the discharge and the intake sides of the pump to a low pressure sump thereby releasing the anchored reaction gear member of the planetary gear unit.

Further objects and features of our invention will become apparent from the following description and from the accompanying drawings, wherein:

FIGURE 1 is a cross sectional assembly view of our improved drive mechanism;

Figure 3:
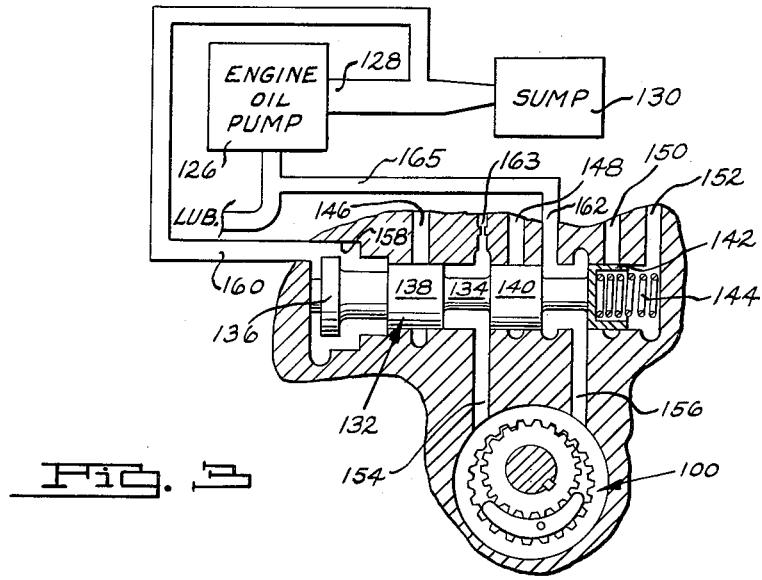
FIGURE 3 is a modified form of an alternate control valve means for initiating speed ratio shifts.

Referring first to FIGURE 1, numeral 10 is used to generally designate a vehicle engine cylinder block and a timing gear housing 12 may be secured to the front face 14 of the cylinder block 10 by suitable bolts, not shown. A vehicle engine crankshaft is shown at 16 and as indicated it extends outwardly from the cylinder block 10. An engine timing gear 18 is positioned about the extended end of crankshaft 16 and is situated adjacent a shoulder 20 formed on crankshaft 16. The gear 18 may be positively connected to crankshaft 16 by means of a key and slot connection, a suitable key 22 being provided for this purpose. Key 22 is received within a key slot formed in crankshaft 16 and it is adapted to cooperate with an internal slot formed in the hub of gear 18.

A planetary gear unit is generally designated by numeral 24 and it comprises a carrier 26, a ring gear 28 and a sun gear 30. The carrier 26 has mounted thereon a plurality of planet pinion shafts 32 which extend in a direction parallel to the axis of crankshaft 16. A planet pinion gear 34 is mounted on each shaft 32 by means of suitable bearings such as needle bearings 36.

The ring gear 28 is carried by means of a gear supporting member 38 which substantially surrounds the planetary gear unit 24. By preference, the ring gear 28 is joined to member 38 by means of a projection 40 which is received within a cooperating aperture formed in member 38.

The carrier 26 is formed with an axially extending sleeve portion 42 which is positively keyed or otherwise secured to crankshaft 16. For this purpose we have preferably provided a key 44 received within a mating key slot in crankshaft 16 and it cooperates with an internal groove formed within the carrier sleeve portion 42. A retainer member 46 is connected to the end of crankshaft 16 by means of a clamping bolt 48, said bolt being threadably received in a threaded opening formed in the end of crankshaft 16. A spacer sleeve surrounds crankshaft 16 as shown at 50 and it is disposed between carrier 26 and the hub of timing gear 18, the latter in turn engaging the shoulder 20 on the crankshaft 16 as previously mentioned.

A sleeve shaft 52 is rotatably journaled about the axis of crankshaft 16 and the carrier extension 42 forms a suitable bearing support. Spaced bushings 54 and 56 are situated between the carrier extension 42 and sleeve shaft 52 to accommodate relative rotation therebetween.

A drive pulley 58 is carried by and secured to sleeve shaft 52 and it is formed with an internally splined central opening through which an externally splined portion of sleeve shaft 52 is received. The splined connection between sleeve shaft 52 and pulley 58 is designated by numeral 60. A suitable snap ring 62 or other securing device is used for retaining the pulley in assembled relationship relative to sleeve shaft 52, the hub of pulley 58 cooperating with a shoulder 64 formed on sleeve shaft 52. A cap 66 may be inserted within the sleeve shaft 52 to provide a suitable end cover. The pulley 58 may comprise one or several V-belt grooves 68 to facilitate a driving connection with a power transmitting belt, the pulley 58 thereby forming the power input member of the belt and pulley system associated with the various vehicle engine accessories.

A shroud or cover 70 surrounds the planetary gear unit 24 and the radially outward periphery thereof is received within a recess 72 formed in timing gear housing 12. The cover 70 is retained in the recess 72 by a suitable snap ring 74.

The cover 70 surrounds sleeve shaft 52 and a suitable lip type seal 76 may be inserted within the inner peripheral margin of the cover 70 to form a fluid tight seal about sleeve shaft 52.

One side of the gear supporting member 38 is positively connected to sleeve shaft 52 in a suitable fashion, and a clutch retainer member 78 is also connected to gear supporting member 38 at the outer margin thereof. This connection is accomplished by means of a projection 80 formed on member 78 which is received in the aforementioned slot formed in the radially outward portion of member 38. A snap ring 82 is provided for retaining the member 78 in assembled relationship. An outer clutch race 84 is received within member 78 and relative rotation between clutch race 84 and the member 78 is prevented by means of an offset portion 86 which forms a reaction shoulder, said portion 86 being received in a cooperating slot formed in the race 84.

The sun gear 30 is carried by a sleeve shaft 88 which extends axially in concentric relationship with respect to crankshaft 16 and it is journaled on spacer sleeve 50 by means of spaced bushings 90 and 92.

Overrunning clutch elements in the form of rollers 94 are disposed between outer race 84 and sleeve shaft 88, the latter forming an inner clutch race. The outer race 84 is formed with cam surfaces which cooperate with rollers thereby preventing relative rotation between clutch race 84 and sleeve shaft 88 in one direction. However, rotation of clutch race 84 and the associated members 78 and 38 in the opposite direction is readily accommodated.

Housing 12 is formed with a pump cavity 96 within which is situated an internal pump gear 98 forming a portion of a positive displacement pump generally identified by numeral 100. The pump 100 also includes an external gear 102 which is eccentrically positioned relative to internal gear 98 and situated in meshing engagement therewith. A fluid pressure inlet port is also formed within the housing 12 as indicated at 104. A pump cover 106 may be bolted to housing 12 by bolts 108 and the cover 106 is formed with a high pressure exhaust port 110 for the pump 100. Ports 104 and 110 communicate with an automatic control valve mechanism hereafter described, and suitable internal fluid pressure passages are provided for this purpose although they are not specifically illustrated in FIGURE 1. The external gear 102 is drivably connected to sleeve shaft 88 by means of a suitable splined connection 112.

A thrust bearing between gear 18 and sleeve shaft 88 is shown at 114 and a thrust washer 116 is situated between sleeve shaft 52 and carrier 26. A thrust element 118 is situated adjacent member 86 and the outer clutch race 84 for retaining the race 84 and the rollers 94 in assembled relationship. Thrust element 118 further includes an axially extending portion 120 which maintains ring gear 28 in a proper axial position.

A thrust washer 122 and a thrust bearing 124 are situated between thrust element 118 and the planetary pinion gears 34. A tab 123 is formed on thrust washer 122 and is inserted in an axial opening formed in carrier 26 to prevent relative rotation between carrier 26 and washer 122.

During operation of the mechanism illustrated in FIGURE 1, the carrier 26 is driven directly by the engine crankshaft 16, and if it is assumed that the pump 100 offers little or no resistance to the rotation of sun gear 30, the planetary pinion gears 34 will drive the sun gear 30 at a speed equal to the speed of carrier 26. Overrunning motion between sun gear 30 and carrier 26 is of course prevented by the overrunning clutch elements 94. Since the sun gear 30 and carrier 26 are thereby driven simultaneously at equal speeds, the ring gear 28 will be driven in unison with carrier 26 and crankshaft 16. This in turn results in a direct driving relationship between pulley 58 and crankshaft 16 since pulley 58 is directly connected to ring gear 40.

If the pump 100 is caused to exert a reaction force on sleeve shaft 88, the sun gear 30 will be held stationary and the overrunning clutch elements 94 will under this circumstance permit an overrunning motion of the carrier 26 relative to the sun gear 30. Since the sun gear 30 then functions as a reaction member, the ring gear 28 will be overspeeded relative to carrier 26 and crankshaft 16. This results in an overdriving speed ratio between the pulley 58 and crankshaft 16. In one embodiment of our invention the overdriving ratio is 1.6:1.

Figure 2:
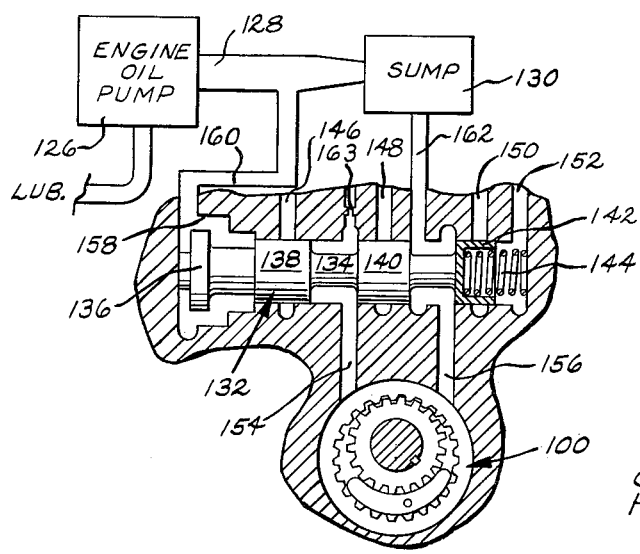
FIGURE 2 is a schematic representation of the control valve means for initiating speed ratio shifts in the assembly of FIGURE 1.

Referring next to FIGURE 2, an automatic control system is provided for automatically conditioning the pump 100 for anchoring sun gear 30 and for alternately permitting free rotation of the same. The engine lubricating oil pump is indicated in FIGURE 2 at 126, and a pump overflow passage is shown at 128. The passage 128 includes a suitable flow restriction and it is exhausted into the low pressure engine oil sump shown at 130. It is thus apparent that at high engine speeds the static pressure in passage 128 will be relatively high and at lower speeds the static pressure will be proportionately lower.

A control valve means is shown at 132 and it includes a multiple land valve spool 134 having spaced valve lands 136, 138, 140 and 142. The valve spool 134 is biased in a left-hand direction as viewed in FIGURE 2 by a valve spring 144. Valve spool 134 is mounted in a cooperating valve chamber and a plurality of exhaust ports communicate with the valve chamber as shown at 146, 148, 150 and 152. The high pressure discharge side of pump 100 communicates with the valve chamber at a location between valve lands 138 and 140, a high pressure passage 154 being provided for this purpose. Similarly, the low pressure intake side of pump 100 communicates with the valve chamber at a location intermediate valve lands 140 and 142, a suitable low pressure intake passage 156 being provided for this purpose. The left end of the valve chamber is formed with a relatively large diameter portion 158 and the aforementioned passage 128 communicates with the left side of the valve chamber through a suitable pressure passage 160.

When the valve spool 134 assumes the position shown in FIGURE 2, valve land 140 interrupts communication between the high pressure pump discharge passage 154 and exhaust port 148. However, direct communication is established between the sump 130 and the pump intake passage 156, the latter communicating directly with a passage 162 which in turn extends to the engine oil sump. It is thus apparent that the pump 100 will be primed with engine oil but the pump gears 98 and 102 will be incapable of relative rotation since the discharge side of the pump is blocked. If desired, a bleed passage 163 may be provided to facilitate priming of the pump 100. Since the pump gear 102 is directly connected to sun gear 30 as previously mentioned, the sun gear 30 will be anchored when the valve spool 134 assumes the position shown. This will result in an overdriving speed relationship between pulley 58 and crankshaft 16.

After the engine speed reaches a calibrated value—for example, 1500 r.p.m.—the engine oil pump pressure in passage 156 will be sufficiently high to cause valve spool 134 to move in a right-hand direction against the opposing force of spring 144. The force required to initiate such a shift is equal to the pressure in passage 128 multiplied by the transverse cross sectional area of valve land 138. After the shift of valve spool 134 is completed, valve land 136 interrupts direct communication between passage 160 and valve land 138, and the region between valve lands 136 and 138 is exhausted through port 146. After the shift has been completed, the total fluid pressure force acting on valve spool 134 is equal to the pressure in passage 128 multiplied by the transverse cross sectional area of valve land 136.

It is thus apparent that when the valve spool 134 assumes the right-hand position, the fluid pressure inlet passage 156 communicates directly with exhaust port 150 and communication between passage 156 and the sump 130 is interrupted. Similarly, valve land 140 uncovers exhaust port 148 after such a shift is completed thereby exhausting the discharge passage 154 through port 148. Since passage 154 is exhausted, and since passage 156 no longer communicates with sump 130, the pump gear 102 is adapted to rotate freely relative to gear 98 and it is no longer effective to anchor sun gear 30. The clutch elements 94 then establish a direct driving ratio between carrier 26 and ring gear 28 as previously mentioned. This in turn results in a direct driving relationship between crankshaft 16 and pulley 58.

An alternate passage arrangement is shown in FIGURE 3 and it comprises a fluid delivery passage 165 extending from the engine oil pump 126 to passage 162. It is contemplated that fluid will be delivered to pump intake passage 156 through passages 165 and 162 when the valve spool 134 assumes the position shown in FIGURE 3. In this alternate arrangement passage 162 does not communicate with the sump 130. It is thus apparent that fluid will be supplied to the intake side of pump 100 under pressure and little or no difficulty will then be encountered in priming the pump 100. We contemplate that passage 165 may communicate directly with a pressurized lubrication passage for the vehicle engine as schematically illustrated in FIGURE 3.

It is emphasized that the use of pump 100 as a means for anchoring sun gear 30 does not result in any pumping horsepower losses. That is, when the sun gear 30 is anchored, the pump gears 98 and 102 remain relatively stationary, and the net pumping horsepower requirement is zero. Similarly, when the mechanism is conditioned for a direct driving ratio, the relatively rotating pump gear members 98 and 102 are ineffective to pump engine oil since the pump inlet side and the pump discharge side are both simultaneously exhausted. The net pumping horsepower is thus zero in each instance.

Having thus described a preferred embodiment of our invention, what we claim and desire to secure by U.S. Letters Patent is:

1. A power transmitting mechanism including a driving member, a driven member, a planetary gear unit including a ring gear member, a sun gear member, a carrier member and planet gears carried by said carrier member in meshing engagement with said sun and ring gear members, said driving member being connected to a first member of said gear unit, said driven member being connected to a second member of said gear unit, a first fluid displacement mechanism, a third member of said gear unit being drivably connected to said fluid displacement mechanism, and valve means responsive to the speed of said driving member for regulating the passage of fluid through said fluid displacement mechanism, a second fluid displacement mechanism drivably connected to said driving member, the discharge pressure of said second fluid displacement mechanism being functionally related to the driving speed of said driving member, said valve means including a valve chamber, the discharge side of said second fluid displacement mechanism communicating with said valve chamber, a movable valve element disposed in said valve chamber and adapted to block the fluid flow path from said first fluid displacement mechanism upon movement thereof in one direction, and means for distributing the fluid discharge pressure of said first fluid displacement mechanism to said valve chamber whereby said valve chamber is urged in the opposite direction.

2. A power transmitting mechanism including a driving member, a driven member, a planetary gear unit including a ring gear member, a sun gear member, a carrier member and planet gears carried by said carrier member in meshing engagement with said sun and ring gear members, said driving member being connected to a first member of said gear unit, said driven member being connected to a second member of said gear unit, a first fluid displacement mechanism having a fluid inlet region and a fluid outlet region, the third member of said gear unit being drivably connected to said fluid displacement mechanism, valve means responsive to the speed of said driving member for controlling the passage of fluid from said outlet region to provide a driving torque reaction whereby said driven member is driven at a first speed ratio relative to said driving member, and means for clutching two members of said gear unit together to provide a direct driving ratio between said driving and driven members when said driving torque reaction is interrupted, a second fluid displacement mechanism drivably connected to said driving member, the discharge pressure of said second fluid displacement mechanism being functionally related to the driving speed of said driving member, said valve means including a valve chamber, the discharge side of said second fluid displacement mechanism communicating with said valve chamber, a movable valve element displosed in said valve chamber and adapted to block the fluid flow path from said first fluid displacement mechanism upon movement thereof in one direction, and means for distributing the fluid discharge pressure of said first fluid displacement mechanism to said valve chamber whereby said valve chamber is urged in the opposite direction.

3. A power transmitting mechanism including a driving member, a driven member, a planetary gear unit including a ring gear member, a sun gear member, a carrier member, planet gears rotatably mounted on said carrier member in meshing engagement with said sun and ring gear members, said driven member being connected to said ring gear member, said driving member being connected to said carrier member, a first fluid displacement mechanism connected to said sun gear member, said fluid displacement mechanism having a fluid inlet region and a fluid outlet region, means for controlling the passage of fluid from said outlet region thereby absorbing the reaction torque of said sun gear member, and clutch means for coupling together two members of said gear unit to provide a direct driving ratio between said driving and driven members, a second fluid displacement mechanism drivably connected to said driving member, the discharge pressure of said second fluid displacement mechanism being functionally related to the driving speed of the driving member, said controlling means comprising a valve chamber, a pressure discharge passage and a fluid supply passage communicating with said first displacement mechanism, said valve chamber partly defining said discharge and supply passages, an exhaust flow path communicating with said valve chamber, a movable valve element disposed in said valve chamber and adapted to block said discharge passage and open said supply passage upon movement thereof in one direction and to open said discharge and supply passages to said exhaust flow path upon movement thereof in the opposite direction, and means for distributing the fluid discharge pressure of said second fluid displacement mechanism to said valve chamber whereby said valve element is urged in said opposite direction.

4. A power transmitting mechanism including a driving member, a driven member, a planetary gear unit including a ring gear member, a sun gear member, a carrier member, planet gears rotatably mounted on said carrier member in meshing engagement with said sun and ring gear members, said driven member being connected to said ring gear member, said driving member being connected to said carrier member, a first fluid pump mechanism having two cooperating fluid pumping elements and including a fluid inlet region and a fluid outlet region, said sun gear member being connected to one of said pumping elements, means for controlling the passage of fluid from said outlet region thereby absorbing the reaction torque of said sun gear member, and clutch means for coupling together two members of said gear unit to provide a direct driving ratio between said driving and driven members, a second pump mechanism drivably connected to said driving member, the discharge pressure of said second pump mechanism being functionally related to the driving speed of the driving member, said controlling means comprising a valve chamber, a pressure discharge passage and a fluid supply passage communicating with said first pump mechanism, said valve chamber partly defining said discharge and supply passages, an exhaust flow path communicating with said valve chamber, a movable valve element disposed in said valve chamber and adapted to block said discharge passage and open fluid supply passage upon movement thereof in one direction and to open said discharge and supply passages to said exhaust flow path upon movement thereof in the opposite direction, and means for distributing the fluid discharge pressure of said second pump mechanism to said valve chamber whereby said valve element is urged in said opposite direction.

5. A power transmitting mechanism including a driving member, a driven member, a planetary gear unit including a ring gear member, a sun gear member, a carrier member and planet gears carried by said carrier member in meshing engagement with said sun and ring gear members, said driving member being connected to a first member of said gear unit, said driven member being connected to a second member of said gear unit, a first fluid displacement mechanism having two cooperating movable elements and including a fluid inlet region and a fluid outlet region, one element being movable relative to the other, a third member of said gear unit being connected to one element of said fluid displacement mechanism, valve means responsive to the speed of said driving member for controlling the passage of fluid from said outlet region to provide a driving torque reaction whereby said driven member is driven at a first speed ratio relative to said driving member, and overrunning coupling means between two members of said gear unit for inhibiting relative rotation therebetween in one direction and for accommodating relative rotation therebetween in the opposite direction, said coupling means assuming an engaged condition when the torque reaction effect of said fluid displacement mechanism is interrupted and assuming an overrunning condition when said fluid displacement mechanism is effective to provide a torque reaction, a second fluid displacement mechanism drivably connected to said driving member, the discharge pressure of said second fluid displacement mechanism being functionally related to the driving speed of the driving member, said valve means comprising a valve chamber, a pressure discharge passage and a fluid supply passage communicating with said first fluid displacement mechanism, said valve chamber partly defining said discharge and supply passages, an exhaust flow path communicating with said valve chamber, a movable valve element disposed in said valve chamber and adapted to block said discharge passage and open said supply passage upon movement thereof in one direction and to open said discharge and supply passages to said exhaust flow path upon movement thereof in the opposite direction, and means for distributing the fluid discharge pressure of said second fluid displacement mechanism to said valve chamber whereby said valve element is urged in said opposite direction.

6. A power transmitting mechanism including a driving member, a driven member, a planetary gear unit including a ring gear member, a sun gear member, a carrier member, planet gears rotatably mounted on said carrier member in meshing engagement with said sun and ring gear members, said driven member being connected to said ring gear member, said driving member being connected to said carrier member, a first fluid displacement mechanism connected to said sun gear member, said fluid displacement mechanism having a fluid inlet region and an outlet region, means for controlling the passage of fluid from said outlet region to accommodate the torque reaction of said sun gear member, and overrunning coupling means for coupling together two members of said gear unit to provide a direct driving ratio between said driving and driven members when the torque reaction of said fluid displacement mechanism is interrupted, said overrunning coupling means accommodating overrunning relative rotation between said two members of said gear unit when the fluid displacement mechanism is effective to provide a torque reaction, a second fluid displacement mechanism drivably connected to said driving member, the discharge pressure of said second fluid displacement mechanism being functionally related to the driving speed of the driving member, said controlling means comprising a valve chamber, a pressure discharge passage and a fluid supply passage communicating with said first fluid displacement mechanism, said valve chamber partly defining said discharge and supply passages, an exhaust flow path communicating with said valve chamber, a movable valve element disposed in said valve chamber and adapted to block said discharge passage and open said supply passage upon movement thereof in one direction and to open said discharge and supply passages to said exhaust flow path upon movement thereof in the opposite direction, means for distributing the fluid discharge pressure of said second fluid displacement mechanism to said valve chamber whereby said valve element is urged in said opposite direction, and a pressure bleed passage communicating with the discharge passage for said second fluid displacement mechanism.

7. A power transmitting mechanism including a driving member, a driven member, a planetary gear unit including a ring gear member, a sun gear member, a carrier member, planet gears rotatably mounted on said carrier member in meshing engagement with said sun and ring gear members, said driven member being connected to said ring gear member, said driving member being connected to said carrier member, a first positive displacement pump having two pumping elements and including a fluid inlet region and a fluid outlet region, one element of said pump being connected to said sun gear member, valve means responsive to the speed of said driving member for controlling the passage of fluid from said outlet region to accommodate the torque reaction of said sun gear member, and overrunning coupling means for coupling together two members of said gear unit to provide a direct driving ratio between said driving and driven members, said overrunning coupling means accommodating free overrunning relative rotation between said two members of said gear unit when said pump is effective to supply torque reaction, a second pump mechanism drivably connected to said driving member, the discharge pressure of said second pump mechanism being functionally related to the driving speed of the driving member, said controlling means comprising a valve chamber, a pressure discharge passage and a fluid supply passage communicating with said first pump mechanism, said valve chamber partly defining said discharge and supply passages, an exhaust flow path communicating with said valve chamber, a movable valve element disposed in said valve chamber and adapted to block said discharge passage and open said supply passage upon movement thereof in one direction and to open said discharge and supply passages to said exhaust flow path upon movement thereof in the opposite direction, and means for distributing the fluid discharge pressure of said second pump mechanism to said valve chamber whereby said valve element is urged in said opposite direction.

8. A power transmitting mechanism including a driving member, a driven member, a planetary gear unit including a ring gear, a sun gear, a carrier, planet gears rotatably mounted on said carrier in meshing engagement with said sun and ring gears, said driven member being connected to said ring gear, said driving member being connected to said carrier, a first positive displacement fluid pump connected to said sun gear, said pump having a fluid inlet region and a fluid outlet region, valve means responsive to the speed of said driving member for controlling the passage of fluid from said outlet region to accommodate the torque reaction of said sun gear member and overrunning coupling means situated between said sun gear and said carrier for coupling said sun gear and carrier together to provide a direct driving ratio between said driving and driven members when said torque reaction is interrupted, said overrunning coupling means accommodating free relative rotation between said carrier and said sun gear when said pump is effective to provide a torque reaction, a second pump mechanism drivably connected to said driving member, the discharge pressure of said second pump mechanism being functionally related to the driving speed of the driving member, said controlling means comprising a valve chamber, a pressure discharge passage and a fluid supply passage communicating with said first pump mechanism, said valve chamber partly defining said discharge and supply passages, an exhaust flow path communicating with said valve chamber, a movable valve element disposed in said valve chamber and adapted to block said discharge passage and open said supply passage upon movement thereof in one direction and to open said discharge and supply passages to said exhaust flow path upon movement thereof in the opposite direction, means for distributing the fluid discharge pressure of said second pump mechanism to said valve chamber whereby said valve element is urged in said opposite direction, and a bleed passage communicating with the discharge side of said first pump mechanism, with supply passage for said first pump mechanism communicating with the discharge side of said second pump mechanism.

9. An engine accessory drive mechanism for delivering power from an engine crankshaft to a rotatable member, a planetary gear unit comprising a sun gear member, a ring gear member, a carrier member and planet gears rotatably mounted on said carrier member in meshing engagement with said sun and ring gear members, said crankshaft being connected to said carrier member, said ring gear member being connected to said rotatable member, releasable means for selectively braking said sun gear member to provide an overdriving speed relationship between said rotatable member and said crankshaft, overrunning clutch means between two members of said gear unit for coupling the same together to provide a direct driving speed relationship between said rotatable member and said crankshaft when said releasable means is released, said releasable means including cooperating fluid pumping elements and having a fluid inlet region and fluid outlet region, and means for controlling the flow of fluid displaced by said pumping elements, one of said pumping elements being connected to said sun gear member, a pump mechanism drivably connected to said driving member, the discharge pressure of said pump mechanism being functionally related to the driving speed of the driving member, said controlling means comprising a valve chamber, a pressure discharge passage and a fluid supply passage communicating with said pump mechanism, said valve chamber partly defining said discharge and supply passages, an exhaust flow path communicating with said valve chamber, a movable valve element disposed in said valve chamber and adapted to block said discharge passage and to open said supply passage upon movement thereof in one direction and to open said discharge and supply passages to said exhaust flow path upon movement thereof in the opposite direction, and means for distributing the fluid discharge pressure of said pump mechanism to said valve chamber whereby said valve element is urged in said opposite direction.

10. An engine accessory drive mechanism for delivering power from an engine crankshaft to a rotatable member, a planetary gear unit comprising a sun gear, a ring gear, a carrier, planet gears mounted on said carrier in meshing engagement with said sun and ring gears, said crankshaft being connected to said carrier, said ring gear being connected to said rotatable member, a releasable means for selectively braking said sun gear to provide an overdriving speed relationship between said rotatable member and said crankshaft, an overrunning clutch means between said carrier and said sun gear for clutching the same together to provide a direct driving speed relationship between said rotatable member and said crankshaft when said releasable means is released, said releasable means including cooperating fluid pumping elements and having a fluid inlet region and fluid outlet region, and means for controlling the flow of fluid displaced by said pumping elements, one of said pumping elements being connected to said sun gear to provide a torque reaction, a pump mechanism drivably connected to said driving member, the discharge pressure of said pump mechanism being functionally related to the driving speed of the driving member, said controlling means comprising a valve chamber, a pressure discharge passage and a fluid supply passage communicating with said pump mechanism, said valve chamber partly defining said discharge and supply passages, an exhaust flow path communicating with said valve chamber, a movable valve element disposed in said valve chamber and adapted to block said discharge passage and to open said supply passage upon movement thereof in one direction and to open said discharge and supply passages to said exhaust flow path upon movement thereof in the opposite direction, and means for distributing the fluid discharge pressure of said pump mechanism to said valve chamber whereby said valve element is urged in said opposite direction, said fluid inlet region communicating with the discharge side of said fluid pump to facilitate priming of said pumping elements.

11. An engine accessory drive mechanism for delivering power from an engine crankshaft to a rotatable member, a planetary gear unit comprising a sun gear member, a ring gear member, a carrier member and planet gears rotatably mounted on said carrier member in meshing engagement with sun and ring gear members, said crankshaft being connected to said carrier member, said ring gear member being connected to said rotatable member, releasable means for selectively braking said sun gear member to provide an overdriving speed relationship between said rotatable member and said crankshaft, overrunning clutch means between two members of said gear unit for coupling the same together to provide a direct driving speed relationship between said rotatable member and said crankshaft when said releasable means is released, said releasable means including cooperating fluid pumping elements, one of said pumping elements being connected to said sun gear member, said pumping elements defining a pump having a fluid delivery passage and a fluid intake passage, and means for alternately blocking said pressure delivery passage and for opening the same to a low pressure exhaust region whereby said sun gear is alternately anchored and released.

12. An engine accessory drive mechanism for delivering power from an engine crankshaft to a rotatable member, a planetary gear unit comprising a sun gear member, a ring gear member, a carrier member and planet gears rotatably mounted on said carrier member in meshing engagement with said sun and ring gear members, said crankshaft being connected to said carrier member, said ring gear member being connected to said rotatable member, releasable means for selectively braking said sun gear member to provide an overdriving speed relationship between said rotatable member and said crankshaft, overrunning clutch means between two members of said gear unit for coupling the same together to provide a direct driving speed relationship between said rotatable member and said crankshaft when said releasable means is released, said releasable means including cooperating fluid pumping elements, one of said pumping elements being connected to said sun gear member, said pumping elements defining a pump having fluid inlet and discharge passages, control valve means situated in and partly defining said discharge passage for alternately blocking said discharge passage and for opening the same to a low pressure exhaust region, said control valve means including a movable valve element, spring means for biasing said valve element toward a discharge passage closing position, and means for subjecting said valve element to an engine speed sensitive fluid pressure whereby said valve element is biased toward a pump discharge passage opening position against an opposing force of said spring means.

13. An engine accessory drive mechanism for delivering power from an engine crankshaft to a rotatable member, a planetary gear unit comprising a sun gear member, a ring gear member, a carrier member and planet gears rotatably mounted on said carrier member in meshing engagement with said sun and ring gear members, said crankshaft being connected to said carrier members, said ring gear member being connected to said rotatable member, releasable means for selectively braking said sun gear member to provide an overdriving speed relationship between said rotatable member and said crankshaft, overrunning clutch means between two members of said gear unit for coupling the same together to provide a direct driving speed relationship between said rotatable member and said crankshaft when said releasable means is released, said releasable means including cooperating fluid pumping elements, one of said pumping elements being connected to said sun gear member, said pumping elements defining a pump having fluid inlet and discharge passages, said fluid pressure discharge passage extending to an exhaust region and said intake passage extending to a low pressure supply oil sump, control valve means for alternately blocking and opening said discharge and inlet passages, said valve means including a movable valve element, spring means for biasing said valve element toward a first operating position wherein said discharge passage is blocked and said inlet passage is opened, and means for subjecting said valve element to a fluid pressure force proportional in magnitude to engine speed whereby said valve element is biased against the opposing force of said spring means to a second operating position whereby said discharge passage is opened and said inlet passage is blocked.

14. An engine accessory drive mechanism for delivering power from an engine crankshaft to a rotatable member, a planetary gear unit comprising a sun gear member, a ring gear member, a carrier member and planet gears rotatably mounted on said carrier member in meshing engagement with said sun and ring gear members, said crankshaft being connected to said carrier member, said ring gear member being connected to said rotatable member, releasable means for selectively braking said sun gear member to provide an overdriving speed relationship between said rotatable member and said crankshaft, overrunning clutch means between two members of said gear unit for coupling the same together to provide a direct driving speed relationship between said rotatable member and said crankshaft when said releasable means is released, said releasable means including cooperating fluid pumping elements, one of said pumping elements being connected to said sun gear member, said pumping elements defining a pump having fluid inlet and discharge passages, said fluid pressure discharge passage extending to an exhaust region and said intake passage extending to a fluid supply, control valve means for alternately blocking and opening said discharge and inlet passages, said valve means including a movable valve element, spring means for biasing said valve element toward a first operating position wherein said discharge passage is blocked and said inlet passage is opened and means for subjecting said valve element to a fluid pressure force proportional in magnitude to engine speed whereby said valve element is biased against the opposing force of said spring means to a second operating position in which said discharge passage is opened and said inlet passage is blocked, said means for producing said fluid pressure force including a source of fluid pressure which is a function of engine speed, and conduit means for subjecting spaced portions of said movable valve element to said pressure when said valve element assumes said first position, portions of said valve element being adapted to interrupt communication between one of said spaced portions and for exhausting the same when said valve element assumes said second operating position.

15. An engine accessory drive mechanism for delivering power from an engine crankshaft to a rotatable member, a planetary gear unit comprising a sun gear member, a ring gear member, a carrier member and planet gears rotatably mounted on said carrier member in meshing engagement with said sun and ring gear members, said crankshaft being connected to said carrier member, said ring gear member being connected to said rotatable member, releasable means for selectively braking said sun gear member to provide an overdriving speed relationship between said rotatable member and said crankshaft, overrunning clutch means between two members of said gear unit for coupling the same together to provide a direct driving speed relationship between said rotatable member and said crankshaft when said releasable means is released, said releasable means including cooperating fluid pumping elements, one of said pumping elements being connected to said sun gear member, said pumping elements defining a pump having fluid inlet and discharge passages, said fluid pressure discharge passage extending to an exhaust region and said intake passage extending to a fluid supply, control valve means for alternately blocking and opening said discharge and inlet passages, said valve means including a movable valve element, spring means for biasing said valve element toward a first operating position in which said discharge passage is blocked and said inlet passage is opened and means for subjecting said valve element to a fluid pressure force proportional in magnitude to engine speed whereby said valve element is biased against the opposing force of said spring means to a second operating position in which said discharge passage is opened and said inlet passage is blocked, said means for producing said fluid pressure force including an engine driven oil pump, and conduit structure communicating with the discharge side of said engine driven pump and extending to spaced regions of said control valve element, portions of said valve element being adapted to interrupt communication between one of said spaced portions and for exhausting the same when said valve element assumes said second operating position.

16. The combination as set forth in claim 15 wherein the discharge side of said engine driven pump communicates with said supply and wherein means are provided for restricting the fluid flow from said engine driven pump to said supply.

References Cited in the file of this patent

UNITED STATES PATENTS

| | | |
|---|---|---|
| 2,221,393 | Carnegie | Nov. 12, 1940 |
| 2,340,241 | Woods | Jan. 25, 1944 |
| 2,343,509 | Jandasek | Mar. 7, 1944 |
| 2,390,626 | Szekely | Dec. 11, 1945 |
| 2,897,691 | Lowe | Aug. 4, 1959 |

FOREIGN PATENTS

| | | |
|---|---|---|
| 426,241 | Italy | Oct. 23, 1947 |
| 290,406 | Switzerland | Aug. 1, 1953 |